(12) United States Patent
Hoopes

(10) Patent No.: US 6,816,350 B1
(45) Date of Patent: Nov. 9, 2004

(54) AC VOLTAGE PROTECTION CIRCUIT

(75) Inventor: Michael L. Hoopes, Novato, CA (US)

(73) Assignee: Illinois Tool Works Inc., Glenview, IL (US)

( * ) Notice: Subject to any disclaimer, the term of this patent is extended or adjusted under 35 U.S.C. 154(b) by 221 days.

(21) Appl. No.: 09/859,018

(22) Filed: May 15, 2001

(51) Int. Cl.[7] .............................................. H02H 3/24
(52) U.S. Cl. ........................................ 361/90; 361/56
(58) Field of Search ............................... 361/91.1–91.6, 361/55, 56, 21, 32, 86, 88, 90, 91.4, 92, 82, 42; 337/17

(56) References Cited

U.S. PATENT DOCUMENTS

| | | | | |
|---|---|---|---|---|
| 3,958,123 A | * | 5/1976 | Hecker | 378/117 |
| 4,584,623 A | * | 4/1986 | Bello et al. | 361/90 |
| 5,654,857 A | * | 8/1997 | Gershen | 361/42 |
| 5,774,322 A | * | 6/1998 | Walter et al. | 361/170 |
| 6,040,969 A | * | 3/2000 | Winch et al. | 361/82 |
| 6,118,639 A | * | 9/2000 | Goldstein | 361/55 |
| 6,614,636 B1 | * | 9/2003 | Marsh | 361/91.1 |

* cited by examiner

Primary Examiner—Gregory J. Toatley, Jr.
Assistant Examiner—Boris Benenson
(74) Attorney, Agent, or Firm—Mark W. Croll; Paul F. Donovan

(57) ABSTRACT

An over-voltage protection circuit for protecting against excessive voltages on the power line, neutral line and ground line. A voltage detection circuit is coupled and monitors the interterminal voltages between the power, neutral and ground lines. A switch circuit, coupled between the power line and load, provides an electrical current path between the power line and load when the voltage detection circuit detects that all of the interterminal voltages are less than a predetermined maximum voltage and the interterminal voltage between the power and neutral line terminals is greater than a predetermined minimum voltage. The switch circuit interrupts this electrical current path when the voltage detection circuit detects that any of the to interterminal voltages is greater than the predetermined maximum voltage. The switch circuit also interrupts this electrical current path when the voltage detection circuit further detects that the interterminal voltage between the power and neutral line terminals is less than the predetermined minimum voltage.

18 Claims, 3 Drawing Sheets

AC VOLTAGE PROTECTION CIRCUIT

BACKGROUND OF THE INVENTION

1. Field of the Invention

The present invention relates to transient voltage surge suppressors (TVSS) for protecting electrical equipment connected to alternating current (AC) electrical power lines, and in particular, to TVSS circuits for protecting electrical loads from sustained excessive AC voltages.

2. Description of the Related Art

Electrical power lines are often subject to surges and other transients of high current or voltage caused by various events, such as lightning switching on or off of significant electrical loads, or even occasional short circuits. Such surges or transients can cause permanent damage to electrical equipment connected to the power line, particularly equipment in which electronic devices are responsible for the consumption and use of the power. Transient voltage surge suppressors have long been used to detect and attempt to block such surges and transients before they reach the devices connected to the power line. The normal standards for determining the effectiveness of such TVSS devices focus upon the limiting of transients of short duraton, such as those resulting from lightning strikes. However, additional relatively common conditions exist which can produce sustained over-voltage conditions whereby the AC voltage presented via the power lines is significantly higher than that for which the connected electrical equipment is designed and capable of operating without damage. For example, poor voltage regulation by the electrical utility provider, improper wiring of the facility, use of standby generators, or incorrect or defective bonding of neutral and ground line connections can all lead to sustained AC over-voltage.

Under such sustained over-voltage conditions, conventional TVSS devices, which use varistors (e.g., metal oxide varistors or "MOV"'s) to limit transients of short duration, will either be ineffective (if their limiting, or "let-through," voltage is more than the peak value of the power line voltage) or simply burn out, since MOV voltage limiters overheat in a very short time when absorbing the excessive power associated with the over-voltage. To address this limitation, one form of conventional TVSS device includes circuitry to detect such over-voltage conditions and cause a switch, such as a relay, to disconnect the load (as well as the MOV circuitry) from the power line when there is a sustained over-voltage condition between the power and neutral voltage lines.

Such devices have generally provided reasonable protection against sustained over-voltage conditions, but still exhibit damage in those applications where, although the line-neutral interterminal voltage was within acceptable limits, one or both of the line-ground or neutral-ground interterminal voltages exceeded such limits.

Accordingly, it would be desirable to have a TVSS device capable of protecting against sustained over-voltage conditions regardless of which of the incoming power lines introduces such condition.

SUMMARY OF THE INVENTION

An over-voltage protection circuit in accordance with the present invention monitors the line-neutral, line-ground and neutral-ground interterminal voltages for an over-voltage condition between any pair of terminals. If any one or more of such interterminal voltages exceeds a predetermined maximum voltage, even for a short time interval, the incoming power line connection is interrupted to protect the load circuitry (as well as any other additional circuitry, such as transient suppression circuitry using MOV devices) from exposure to such excessive voltage. This power interruption is maintained for so long as such over-voltage condition exists. Additionally, the incoming interterminal voltages can be monitored for under-voltage conditions, whereby the load can be protected from exposure to low voltage (e.g., "brownout") conditions.

An over-voltage protection circuit for protecting against excessive voltages on two or more of a power line, neutral line and ground line in accordance with one embodiment of the present invention includes power, neutral, ground and load terminals, a voltage detection circuit and a switch circuit. The power, neutral, ground and load terminals provide for power, neutral, ground and load connections, respectively. The voltage detection circuit is coupled between the power, neutral and ground line terminals, and monitors interterminal voltages between such terminals. The switch circuit is operatively coupled to the voltage detection circuit and between the power line and load terminals, and provides an electrical current path between the power line and load terminals when the voltage detection circuit detects that all of the interterminal voltages are less than a predetermined maximum voltage, and interrupts the electrical current path when the voltage detection circuit detects that any one or more of the interterminal voltages is greater than the predetermined maximum voltage.

An over-voltage protection circuit for protecting against excessive voltages on two or more of a power line, neutral line and ground line in accordance with another embodiment of the present invention includes power, neutral, ground and load terminals, a voltage detection circuit and a switch circuit. The power, neutral, ground and load terminals provide for power, neutral, ground and load connections, respectively. The voltage detection circuit is coupled between the power, neutral and ground line terminals, and monitors interterminal voltages between such terminals. The switch circuit is operatively coupled to the voltage detection circuit and between the power line and load terminals, and: provides an electrical current path between the power line and load terminals when the voltage detection circuit detects that all of the interterminal voltages are less than a predetermined maximum voltage and the interterminal voltage between the power and neutral line terminals is greater than a predetermined minimum voltage; interrupts the electrical current path when the voltage detection circuit detects that any one or more of the interterminal voltages is greater than the predetermined maximum voltage; and interrupts the electrical current path when the voltage detection circuit detects that the interterminal voltage between the power and neutral line terminals is less than the predetermined minimum voltage.

DETAILED DESCRIPTION OF THE INVENTION

Figure 1:
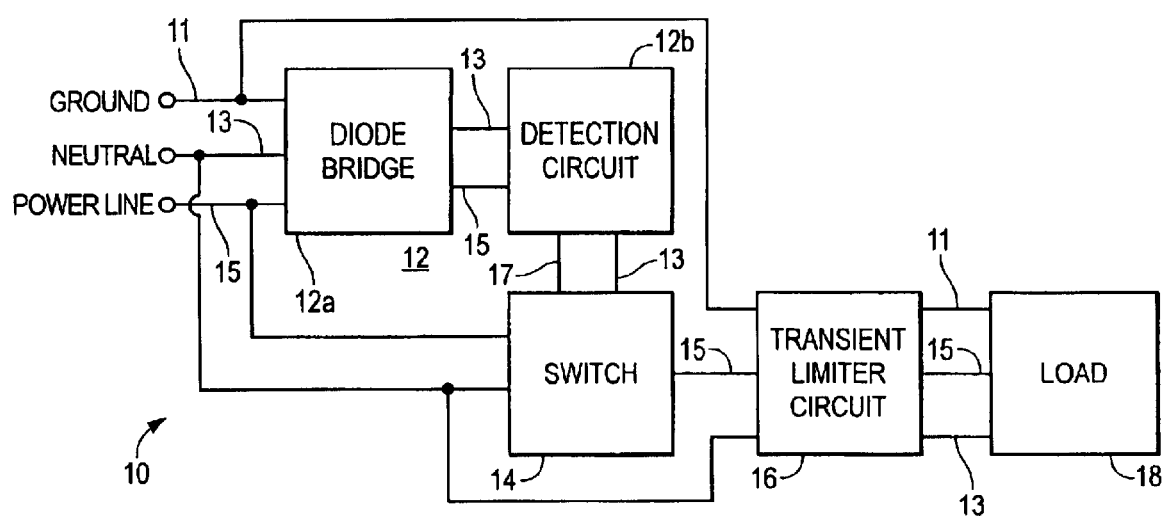
FIG. 1 is a functional block diagram of an over-voltage protection circuit for protecting an electrical load in accordance with one embodiment of the present invention.

Referring to FIG. 1, an over-voltage protection circuit 10 for protecting a load 18 against sustained over-voltage conditions includes a voltage detection circuit 12 (with diode bridge 12a and detection 12b circuits), a switch 14 and a transient limiter circuit 16, all interconnected substantially as shown (and discussed in more detail below). The ground 11, neutral 13 and power 15 lines connect to the voltage detection circuit 12, switch 14 and transient limiter circuit 16. The voltage detection circuit 12 monitors the interterminal voltages between each combination of the ground 11, neutral 13 and power 15 lines.

Whenever any one or more of such interterminal voltages exceeds a predetermined maximum voltage, the voltage detection circuit 12, via control 17, instructs the switch (e.g., relay) to interrupt the current path of the incoming power line 15 to the transient limiter circuit 16 and load 18, thereby preventing the excessive voltage appearing on the power line 15 from reaching the transient limiter circuit 16 and load 18. Additionally, the voltage detection circuit 12 may detect when the voltage between the neutral 13 and power 15 lines falls below a predetermined minimum voltage whereupon the switch 14 is instructed to disconnect the incoming power line 15 from the transient limiter circuit 16 and load 18, thereby preventing damage that can be caused by an under-voltage condition.

Figure 2:
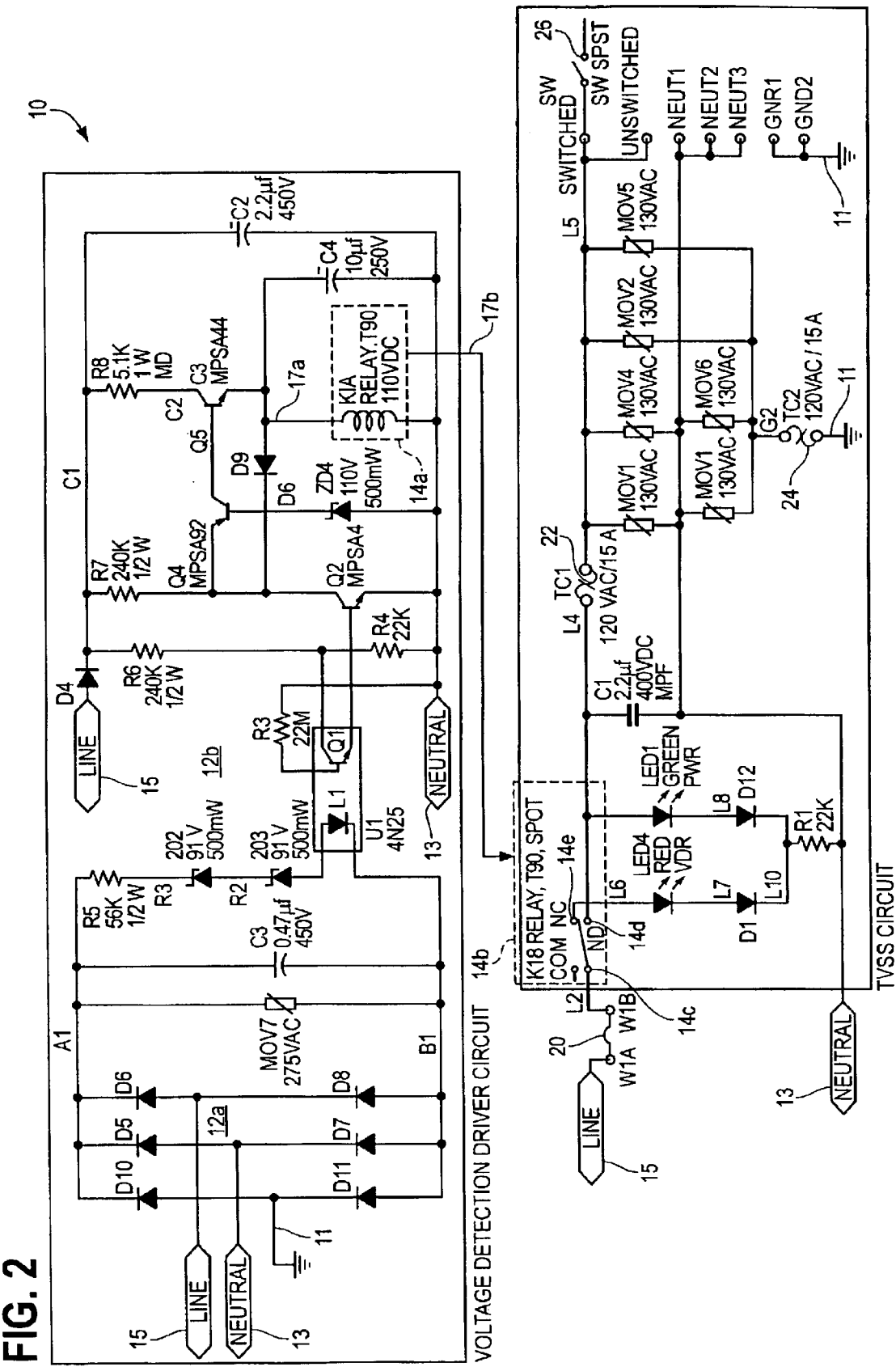
FIG. 2 is an electrical schematic diagram of the over-voltage protection circuit of FIG. 1.

Referring to FIG. 2, a specific implementation of the over-voltage protection circuit of FIG. 1 will be described. The diode bridge circuit 12a connects to the ground 11, neutral 13 and power 15 lines via diodes D5, D6, D7, D8, D10 and D11. The line-neutral interterminal voltage is monitored through diodes D5, D6, D7 and D8. The line-ground interterminal voltage is monitored through diodes D6, D8, D10 and D11. The neutral-ground interterminal voltage is monitored through diodes D5, D7, D10 and D11. In each case, the resulting rectified interterminal voltage appears at terminals A1 and B1 across filter capacitor C3 and varistor MOV 7. This rectified voltage is also applied across a "maximum" voltage detection circuit formed by the series connection of resistor R5, zener diodes ZD2 and ZD3, and the input light emitting diode (LED) L1 of optoisolator U1.

While each of the interterminal voltages between the ground 11, neutral 13 and power 15 lines is less than the predetermined maximum voltage, none of the rectifier diodes D5, D6, D7, D8, D10, D11 become conductive since the threshold (i.e., zener breakdown) voltages of the zener diodes ZD2, ZD3 have not been exceeded. Accordingly, no current flows through the LED L1 of the optoisolator U1. Hence the output transistor Q1 of the optoisolator U1 remains turned off which, in turn, causes transistor Q2 to remain biased in an off state.

With transistor Q2 in an off state, the incoming power line voltage, rectified by diode D4 and filtered by capacitor C2, causes zener diode ZD4 to become conductive (since its threshold, or breakdown, voltage is exceeded by the rectified incoming power line voltage) and transistor Q4 to turn on. This causes a base current for transistor Q3 to be produced (limited by resistor R7), thereby causing transistor Q3 to turn on and provide a drive current 17a for the input coil 14a of the relay 14. (No current diversion takes place through diode D9 since transistor Q2 is turned off.) As a result, in accordance with well known relay operation, the magnetic energy 17b produced by the relay coil 14a causes the relay pole 14c of the relay output 14b to be connected to relay throw 14d, thereby providing a current path for electrical current from the power line connection 15 to the output switch 26 (via a hardwired jumper 20 and thermal cutoff device 22).

With output power thus available, current also flows through resistor R1, diode D12 and light emitting diode LED1. This lighting of diode LED1 indicates a proper power connection to the output switch 26.

Over-voltage protection for the interterminal voltages between the ground 11, neutral 13 and power line 15 connections is provided by way of multiple varistors MOV1, MOV2, MOV3, MOV4, MOV5, MOV6. Additionally, a fuse 24 provides protection against burning up varistors MOV2, MOV3, MOV5 and MOV6.

When any one of the rectified interterminal voltages exceeds the combined threshold, or breakdown, voltages of zener diodes ZD2 and ZD3, these diodes ZD2, ZD3 become conductive (due to zener breakdown) and current flows through the diode L1 of the optoisolator U1, thereby causing the LED L1 to emit light. This optical energy emitted by the LED L1 causes the base-emitter junction of output transistor Q1 within the optoisolator U1 to become forward biased, thereby turning on transistor Q1. This causes base current to become available for transistor Q2, thereby turning transistor Q2 on in a saturated state. This causes the emitter terminal of transistor Q4 and cathode of diode D9 to become effectively shorted to the neutral line 13. As a result, transistor Q4 and zener diode ZD4 are turned off, thereby preventing the flow of base current to transistor Q3. Transistor Q3 becomes turned off, thereby eliminating the drive current for the relay coil 14a. With transistor Q2 and diode D9 both turned on, the charge stored in capacitor C4 is quickly depleted, thereby causing the relay coil 14a to become quickly deactivated.

With the elimination of the drive current for the relay coil 14a and depletion of charge across capacitor C4 (and, therefore, the collapse of the magnetic field 17b), the relay pole 14c becomes connected to relay throw 14e, thereby interrupting the current path between the power line connection 15 and the output switch 26. Instead, current now flows through resistor R1, diode D1 and light emitting diode LED4. This lighting of diode LED4 indicates the interruption of output power due to the over-voltage condition.

Another condition, which this circuit 10 protects against, is an under-voltage condition between the neutral 13 and power 15 lines. During such a condition, the interterminal voltage between the neutral 13 and power 15 lines is insufficient to cause zener diode ZD4 to go into zener breakdown, thereby preventing diode ZD4 and transistor Q4 from turning on. In turn, this prevents transistor Q3 from receiving a base current. As a result, transistor Q3 is turned off and no current is available to drive the relay coil 14a and generate a magnetic field 17b to cause the relay output 14b to connect pole 14c to throw 14d. Instead, the relay pole 14c remains connected to relay throw 14e, thereby interrupting the current path between the power line is and output switch 26, and causing diode LED4 to be lit. This lighting of diode LED4 indicates the interruption of the output power due to an under-voltage condition.

From the foregoing it should be readily appreciated that this circuit is designed to respond to an over-voltage condition more rapidly than to an under-voltage condition. In the event of an over-voltage condition, as discussed above, not only is the drive current to the relay coil 14a from transistor Q3 terminated, but the existing charge across capacitor C4 is also quickly depleted via transistor Q2 and diode D9. This causes the relay coil 14a to deactivate quickly. In the event of an under-voltage condition, however, the drive current to the relay coil 14a from transistor Q3 is terminated, but the existing charge across capacitor C4 is allowed to become depleted more slowly through the windings of the relay coil 14a. This causes the relay coil 14a to deactivate more slowly.

Figure 3A:
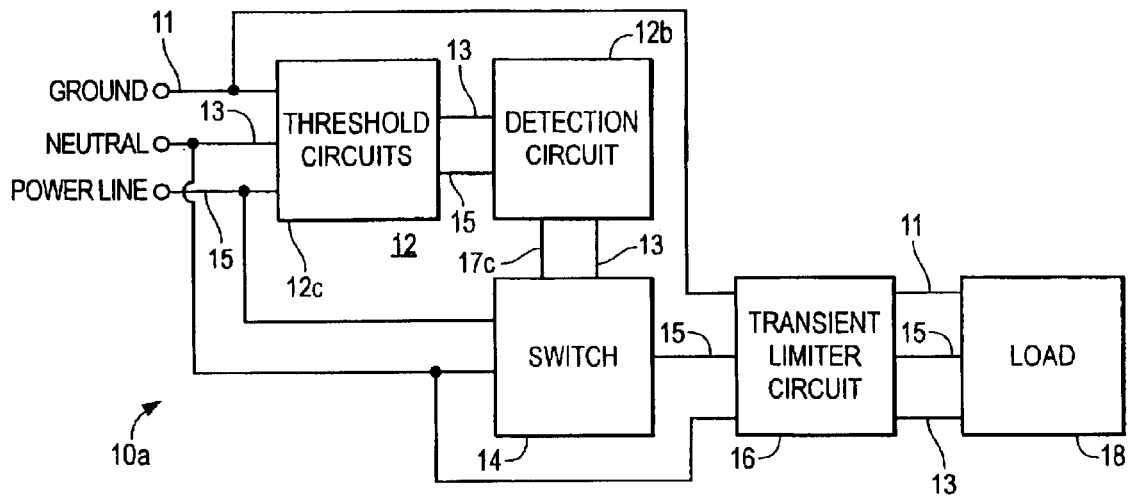
FIG. 3A is a functional block diagram of an over-voltage protection circuit for protecting an electrical load in accordance with another embodiment of the present invention.
Figure 3B:
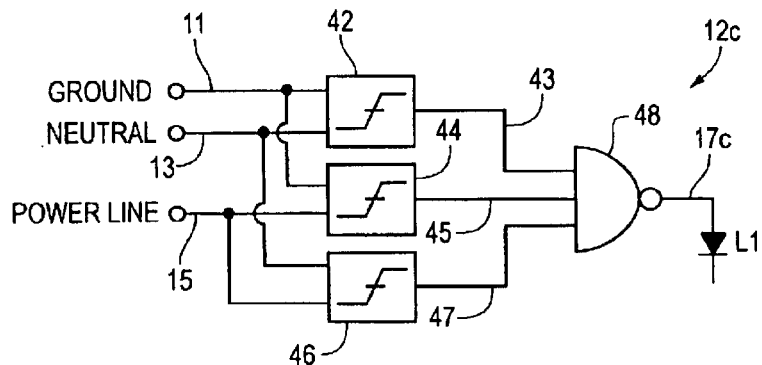
FIG. 3B is a functional block diagram of the threshold circuits stage of the circuit of FIG. 3A.

Referring to FIGS. 3A and 3B, another embodiment 10a of the present invention uses a threshold circuits stage 12c to monitor the interterminal voltages. Separate conventional threshold detection circuits 42, 44, 46 monitor the individual neutral-ground, line-ground and line-neutral interterminal voltages separately. In the event that any one or more of the interterminal voltages exceeds the corresponding threshold voltages associated with the threshold detection circuits 42, 44, 46, the corresponding threshold detector output signals 43, 45, 47 are asserted as appropriate. These signals 43, 45, 47 are active low and are processed by a logical NAND gate. Hence, whenever any one of the interterminal voltages exceeds its associated threshold voltage, the corresponding threshold detector output signal is asserted low, thereby ensuring that the NAND gate output signal 49 is asserted high. This signal 17c, when high, causes the diode L1 of the optoisolator U1 to emit light and turn on output transistor Q1 (thereby activating transistor Q2 and deactivating transistors Q4 and Q3 as discussed above).

Figure 4A:
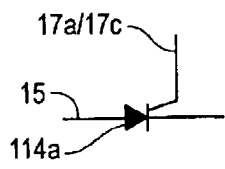
FIGS. 4A, 4B, 4C illustrate power semiconductor devices that may be used as substitutes in place of the electromechanical relay in the circuit of FIG. 2.
Figure 4B:
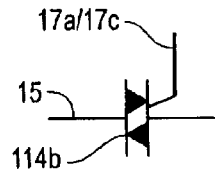
Figure 4C:
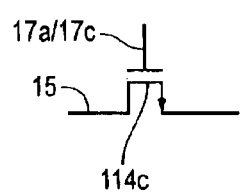

Referring to FIGS. 4A and 4B, in regard to the switch 14 used, as will be readily understood and appreciated by one of ordinary skill in the art, depending upon load current requirements, it is possible to substitute the use of a power semiconductor device in place of an electromechanical relay. Suitable examples would include a thyristor device, such as a silicon controlled rectifier (SCR) 114a (FIG. 4A) or triac 114b (FIG. 4B), or a power metal oxide semiconductor field effect transistor (MOSFET) 114c (FIG. 4C). If so, the drive current 17a provided by transistor Q3 (converted to a voltage as necessary) or control signal 17c from NAND gate 48 would control the gate terminal of the SCR 114a, triac 114b or MOSFET 114c in accordance with well known conventional techniques.

Various other modifications and alterations in the structure and method of operation of this invention will be apparent to those skilled in the art without departing from the scope and spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims be covered thereby.

What is claimed is:

1. An apparatus including an over-voltage protection circuit for protecting against excessive voltages between two or more of a power line, neutral line and ground line, including:
   a power line terminal that provides for a power line connection;
   a neutral line terminal that provides for a neutral line connection;
   a ground line terminal that provides for a ground line connection;
   a load terminal that provides for a load circuit connection;
   a voltage detection circuit, coupled between said power, neutral and ground line terminals, that monitors a plurality of interterminal voltages between said power, neutral and ground line terminals wherein the voltage detection circuit includes a diode bridge circuit coupled to said power, neutral and ground terminals; and
   a switch circuit, operatively coupled to said voltage detection circuit and between said power line and load terminals, that provides an electrical current path between said power line and load terminals when said voltage detection circuit detects that all of said plurality of interterminal voltages are less than a predetermined maximum voltage and said interterminal voltage between said power line terminal and said neutral line terminal is greater than a predetermined minimum voltage, and
   interrupts said electrical current path when said voltage detection circuit detects that any one or more of said plurality of interterminal voltages is greater than said predetermined maximum voltage and
   interrupts said electrical current path when said voltage detection circuit detects that said interterminal voltage between said power line terminal and said neutral line terminal is less than said predetermined minimum voltage and wherein said voltage detection circuit responds to an over-voltage condition more rapidly than to an under-voltage condition.

2. The apparatus of claim 1, wherein said voltage detection circuit comprises a voltage threshold detection circuit with an associated threshold voltage corresponding to said predetermined maximum voltage.

3. The apparatus of claim 1, wherein said switch circuit comprises a relay.

4. The apparatus of claim 1, wherein said switch circuit comprises a power semiconductor device.

5. The apparatus of claim 1, further comprising a voltage transient limit circuit, selectively coupled between two or more of said power, neutral and ground line terminals, that limits a plurality of interterminal voltage transients between said selectively coupled power, neutral and ground line terminals.

6. An apparatus including an over-voltage protection circuit for protecting against excessive voltages between two or more of a power line, neutral line and ground line, including:
   power line means for providing a power line connection;
   neutral line means for providing a neutral line connection;
   ground line means for providing a ground line connection;
   load means for providing a load circuit connection;
   voltage detector means for monitoring a plurality of interterminal voltages between said power, neutral and ground line means, said voltage detector means including diode means for rectifying said plurality of interterminal voltages; and
   switch means for providing an electrical current path between said power line and load means when said voltage detector means detects that all of said plurality of interterminal voltages are less than a predetermined maximum voltage and said interterminal voltage between said power line means and said neutral line means is greater than a predetermined minimum voltage, and
   interrupting said electrical current path when said voltage detector means detects that any one or more of said plurality of interterminal voltages is greater than said predetermined maximum voltage, and interrupting said electrical current path when said voltage detector means detects that said interterminal voltage between said power line means and said neutral line means is less than said predetermined minimum voltage and wherein said voltage detector means responds to an over-voltage condition more rapidly than to an under-voltage condition.

7. The apparatus of claim 6, wherein said voltage detector means comprises voltage threshold detector means for becoming activated when an internal voltage exceeds an associated threshold voltage corresponding to said predetermined maximum voltage.

8. The apparatus of claim 6, further comprising voltage transient limiter means for limiting a plurality of interterminal voltage transients between two or more of said power, neutral and ground line terminals.

9. An apparatus including an over-voltage protection circuit for protecting against excessive voltages between two or more of a power line, neutral line and ground line, including:

a power line terminal that provides for a power line connection;

a neutral line terminal that provides for a neutral line connection;

a ground line terminal that provides for a ground line connection;

a load terminal that provides for a load circuit connection;

a voltage detection circuit, coupled between said power, neutral and ground line terminals, that monitors a plurality of interterminal voltages between said power, neutral and ground line terminals; and a switch circuit, operatively coupled to said voltage detection circuit and between said power line and load terminals, that provides an electrical current path between said power line and load terminals when said voltage detection circuit detects that all of said plurality of interterminal voltages are less than a predetermined maximum voltage and said interterminal voltage between said power and neutral line terminals is greater than a predetermined minimum voltage, interrupts said electrical current path when said voltage detection circuit detects that any one or more of said plurality of interterminal voltages is greater than said predetermined maximum voltage, and interrupts said electrical current path when said voltage detection circuit detects that said interterminal voltage between said power and neutral line terminals is less than said predetermined minimum voltage and wherein said voltage detection circuit resounds to an over-voltage condition more rapidly than to an under-voltage condition.

10. The apparatus of claim 9, wherein said voltage detection circuit comprises a diode bridge circuit coupled to said power, neutral and ground line terminals.

11. The apparatus of claim 9, wherein said voltage detection circuit comprises a voltage threshold detection circuit with a first accociated threshold voltage corresponding to said predetermined maximum voltage and a second associated threshold voltage corresponding to said predetermined minimum voltage.

12. The apparatus of claim 9, wherein said switch circuit comprises a relay.

13. The apparatus of claim 9, wherein said switch circuit comprises a power semiconductor device.

14. The apparatus of claim 9, further comprising a voltage transient limit circuit, selectively coupled between two or more of said power, neutral and ground line terminals, that limits a plurality of interterminal voltage transients between said selectively coupled power, neutral and ground line terminals.

15. An apparatus including an over-voltage protection circuit for protecting against excessive voltages between two or more of a power line, neutral line and ground line, including:

power line means for providing a power line connection;

neutral line means for providing a neutral line connection;

ground line means for providing a ground line connection;

load means for providing a load circuit connection;

voltage detector means for monitoring a plurality of interterminal voltages between said power, neutral and ground line means; and switch means for providing an electrical current path between said power line and load means when said voltage detector means detects that all of said plurality of interterminal voltages are less than a predetermined maximum voltage and said interterminal voltage between said power and neutral line terminals is greater than a predetermined minimal voltage, interrupting said electrical current path when said voltage detector means detects that any one or more of said plurality of interterminal voltages is greater than said predetermined maximum voltage, and interrupting said electrical current path when said voltage detector means detects that said interterminal voltage between said power and neutral line terminals is less than said predetermined minimum voltage and wherein said voltage detection means responds to an over-voltage condition more rapidly than to an under-voltage condition.

16. The apparatus of claim 15, wherein said voltage detector means comprises diode means for rectifying said plurality of interterminal voltages.

17. The apparatus of claim 15, wherein said voltage detector means comprises voltage threshold detector means for becoming conductive when:

a first internal voltage exceeds a first associated threshold voltage corresponding to said predetermined maximum voltage; or a second internal voltage exceeds a second associated threshold voltage corresponding to said predetermined minimum voltage.

18. The apparatus of claim 15, further comprising voltage transient limiter means for limiting a plurality of interterminal voltage transients between two or more of said power, neutral and ground line terminals.

* * * * *